June 21, 1932. W. B. OWEN 1,864,464
AUTOMOBILE SIGNALING DEVICE
Filed May 10, 1930 3 Sheets-Sheet 1

W. B. Owen, INVENTOR
BY Victor J. Evans
ATTORNEY

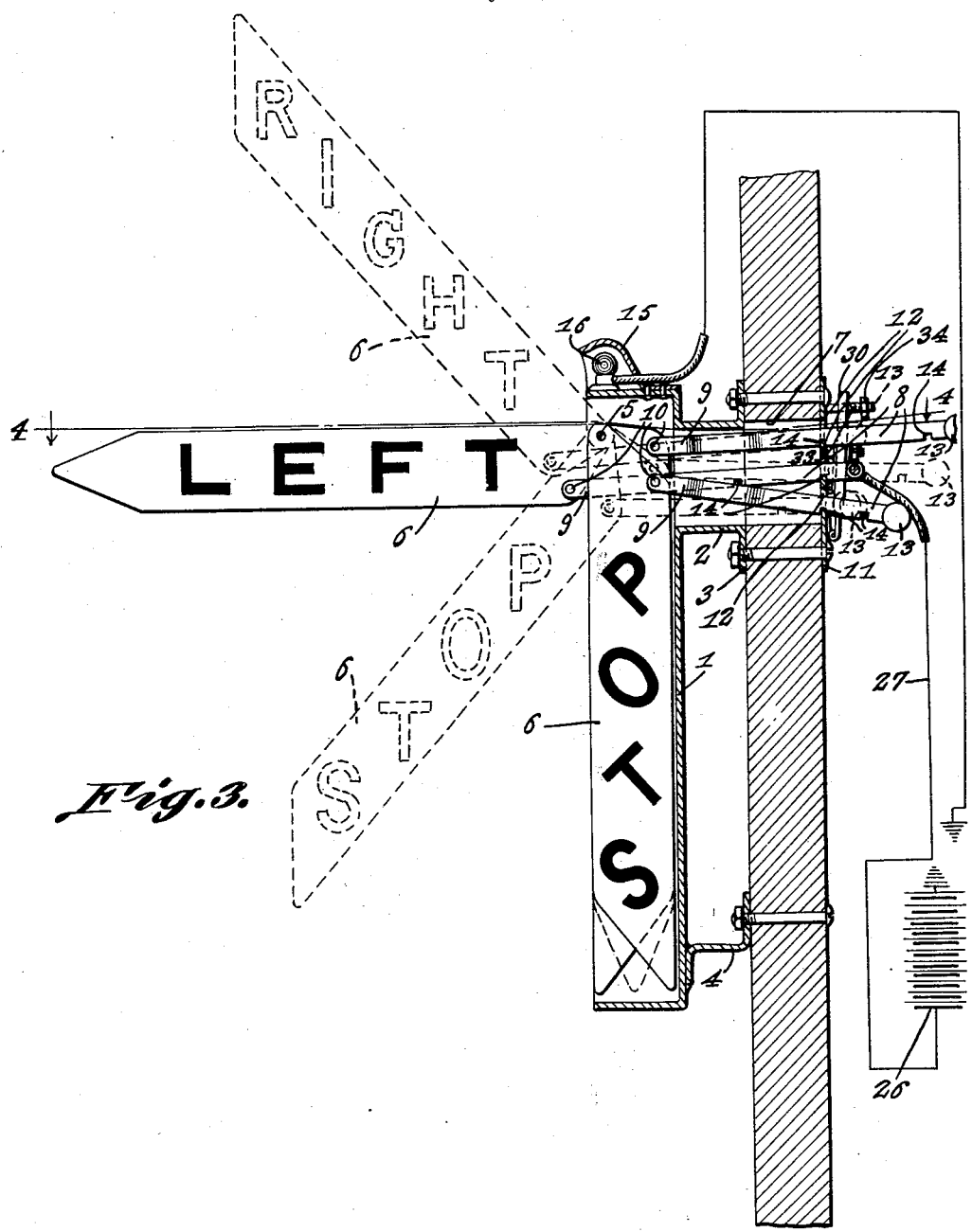

June 21, 1932. W. B. OWEN 1,864,464
AUTOMOBILE SIGNALING DEVICE
Filed May 10, 1930 3 Sheets-Sheet 3
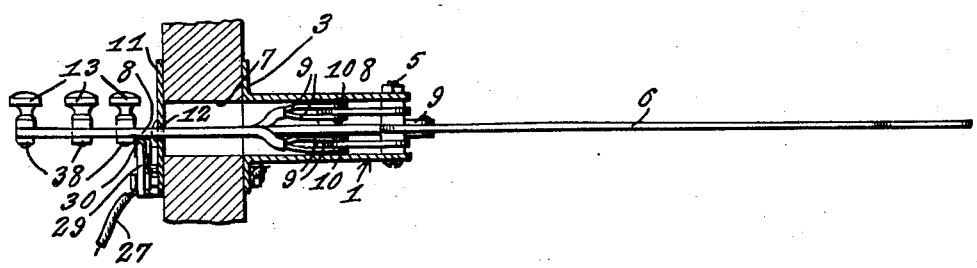
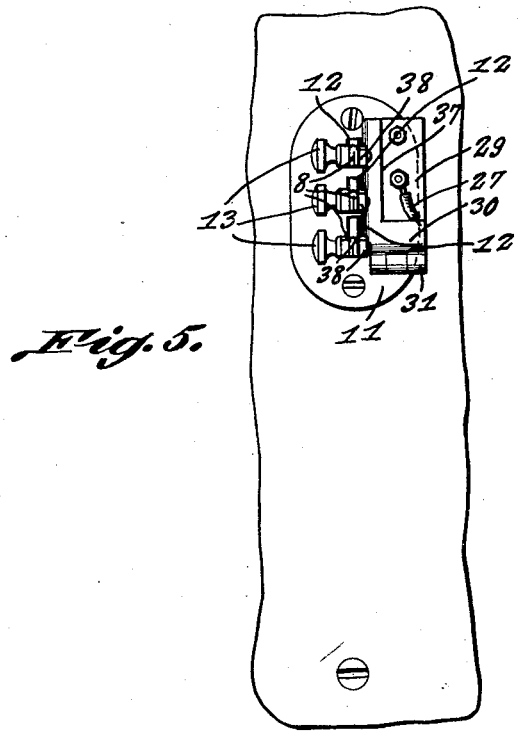
W. B. Owen, INVENTOR
BY Victor J. Evans
ATTORNEY Patented June 21, 1932

1,864,464

UNITED STATES PATENT OFFICE

WILLIAM B. OWEN, OF LAS VEGAS, NEVADA

AUTOMOBILE SIGNALING DEVICE

Application filed May 10, 1930. Serial No. 451,371.

This invention relates to signal devices for use on automobiles for indicating turns to be made and likewise for giving warning, and has as one of its objects to provide a device which may be readily installed upon any automobile and in position convenient for operation by the driver of the automobile to display the proper signal and, in this connection, the invention contemplates the provision of novel means for closing the battery circuit through the light bulb to illuminate the display signal at the time it is swung to display position.

Another object of the invention is to so construct manually operable means whereby the signals are selectively displayed so that each may be operated entirely independently of the others and in a moment's time, the operating means being so constructed as to hold the display signal in display position until the means is again actuated to permit return of the signal to non-display position.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing my invention in detail, reference will be had to the accompanying drawings wherein like characters denote like or corresponding parts throughout the several views, and in which:—

Figure 3 is a vertical transverse sectional view through the device, one of the signal arms being shown in elevation in display position, and the other arms being shown in display position in dotted lines, the view also illustrating the circuit for the light bulb.

Figure 4 is a horizontal sectional view taken substantially on the line 4—4 of Figure 3 looking in the direction indicated by the arrows.

Figure 5 is a detail view in elevation illustrating the actuating means for the signal arms, each means is mounted upon a portion of the frame of the automobile.

Figure 1:
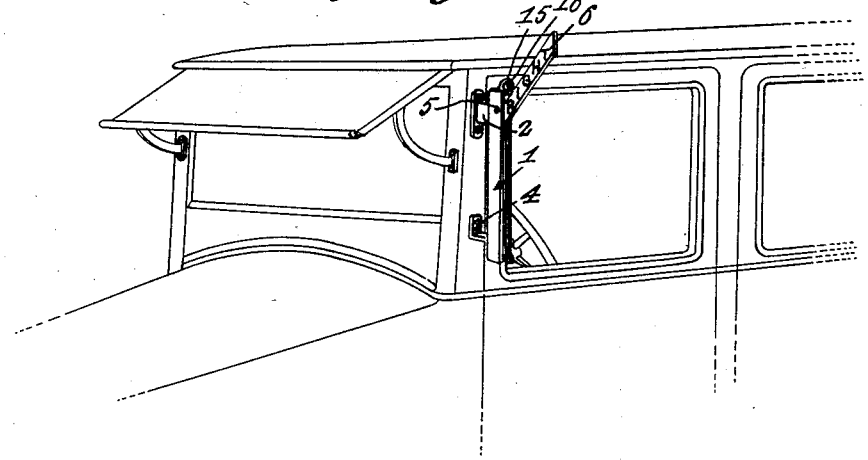
Figure 1 is a perspective view illustrating the signal device of the present invention installed upon an automobile.

The device comprises a housing which is indicated in general by the numeral 1 in which the signal arms are to be housed when in non-display position and, near its upper end, this housing is provided with a lateral extension indicated by the numeral 2 which is flanged as at 3 to provide for attachment of the upper end of the casing to any convenient fixed part of the body of the automobile. A bracket 4 of any ordinary type may be provided for attaching the lower end of the housing to the said part of the automobile, and the housing is open at its side opposite the side at which the extension 2 is located and, as shown in Figure 1 of the drawings, the device is to be mounted at the left hand side of the automobile and the signal arms are, in a manner which will presently be described, adjustable to display position extending laterally, outwardly beyond the housing as shown in the said Figure 1.

The numeral 5 indicates a shaft or bolt which extends transversely within the housing between the side walls thereof and below the closed top thereof, and the signal arms which are indicated by the numeral 6 are all pivotally mounted at their inner ends upon this shaft or bolt and each arm bears either a direction signal or a caution signal.

In installing the device, an opening 7 will be formed in the part of the automobile body upon which the device is mounted, if it should be found necessary, so that the open outer end of the extension 2 of the housing 1 will be in communication with this opening. The means provided for effecting swinging movement of the signal arms 6 to display and non-display position, comprises an operating arm 8 having a yoke 9 at its end which extends into the housing 1 and the arms of the yoke of each of the arms 8 are disposed to straddle that upper corner of the signal arm 6 opposite the corner which is pivoted, and a pivot pin 10 is fitted through the ends of the yoke arms and through the said corner of the signal arm. In order that the signal arms may be held in display and non-display position, a plate 11 is mounted upon the inner side of the fixed part of the automobile body in which the opening 7 is formed and covers the said opening and this plate is formed with a vertical series of slots 12 through which respective ones of the arms 8 are slidably fitted, the slots being located one above another. A finger knob 13 is mounted at the free end of each arm 8 and each arm is formed with a pair of notches 14, these notches being spaced with respect to each other and at such a distance apart so that when any one of the arms is shifted through the slot in which it is mounted to effect swinging of the respective signal arm to display position, the lower end wall of the slot in which the arm is mounted will engage in one of the notches 14 in said arm, it being understood that the arms rest, by gravity, with their lower ends in engagement with the bottom walls of the recesses and, when the arm is shifted so as to swing the signal blade to non-display position, the bottom wall of the slot will engage in the other notch 14.

The device will of course be so arranged that all of the finger knobs 13 will be located in such position as to permit of any one of them being grasped and the corresponding arm quickly shifted to effect adjustment of the respective signal arm, it being understood, by reference to Figure 3 of the drawings that the arms are arranged in offset relation to one another in a vertical plane. At this point it will be evident that when the driver of the automobile, equipped with the device of the invention, grasps and shifts one of the arms 8 so as to effect swinging movement of the respective signal arm 6 to extent of display position, the arm will be held, when released, in the position to which it has been adjusted and will maintain this position until a slight upward thrust is exerted upon the finger knob 13, whereupon the arm and signal blade will be returned to non-display position, automatically, by gravity and, as the arm slides through the respective slot and the signal arm assumes a non-display position housed within the housing 1, the operating arm will be automatically locked in this position so that in any swaying or tilting of the automobile there will be no liability of any outward swinging of any of the signal arms.

In accordance with the principles of the present invention, each signal arm is to be illuminated, automatically, at the time it reaches display position, and the source of illumination is to remain energized until the arm is released and returns to non-display position and this means will now be described.

The numeral 15 indicates a small sheet metal housing and reflector which is mounted upon the closed top of the housing 1 and the electric light bulb socket 16 is mounted upon the said closed top of the housing 1 and within the reflector 15, the open side of the reflector being presented in such direction as to direct the light rays reflected therefrom onto any one of the signal arms which is swung to display position. A metallic socket 17 is mounted in an opening 18 formed in the fixed part of the automobile body at one side of the opening 7 and a stem 19 is integral with the closed end of this socket and fits through an opening 20 formed in the plate 11, and a conductor wire 21 is electrically connected with the stem 19 and to one terminal of the light bulb socket 16. The opening 18 is lined with an insulating material 18' which surrounds the socket member 17. A plunger 22 of metal is slidably fitted in the bore of the socket 17 and a compression spring 23 is likewise arranged within this bore and bears at one end against the closed end of the socket and at its other end against the plunger 22 and the plunger is provided with a stem 24 which fits slidably through an opening 25 formed in the flange 3 of the extension 2 of the housing 1. As shown in Figure 3 of the drawings, the wire 21 is led to ground by being connected at its other end to some electric conducting part of the automobile frame and, to the positive terminal of the automobile battery 26 by a conductor wire 27 with a contact point 28 which is mounted upon a strip 29 of insulating material, and this strip is disposed and held between two leaves 30 formed by bending a strip of sheet metal, and at its folded end this folded strip is overturned to provide a pintle ear 31 which is mounted upon a pintle pin 32, in turn mounted upon the plate 11.

A threaded stem 33 is provided upon the said plate 11 and an abutment nut 34 is fitted adjustably upon this stem and the said stem extends through an opening 35 formed in the upper or free end of the leaves 30 and the strip 29 of insulating material. A coiled spring 36 is mounted at one of its branches upon the plate 11 and the other branch of the spring bears against one of the leaves 30 and this spring serves to hold the swinging contact member, comprising the leaves 30 and strip 29, normally in the position shown in Figure 2 of the drawings, in which position the contact point 28 will be presented opposite to the end of the stem 24 of the plunger 22 and in spaced relation with respect thereto. The said swinging contact member is so mounted as to normally assume substantially the inclined position shown in Figure 2 and as shown in Figures 4 and 5 of the drawings, the leaves 30 are cut away at one side as indicated by the numeral 37 so that the marginal portions of the leaves which are presented toward the arms 8 are in the path of nuts 38 by which the finger knobs 13 are secured to the arms 8 and therefore, when any one of the arms is shifted slidably through the respective slot 12 and the respective signal arm is swung to display position, and, at the time the notch 14, in said arm, which is adjacent the finger knob, engages the the bottom wall of the slot, the said nut 38 will ride against the said marginal portion of one of the leaves 30 and the contact element 28 will be brought into engagement with the stem 24 of the plunger 22 thus closing the circuit through the light bulb socket 16 and through the filament of the bulb therein to illuminate the signal arm as the same assumes display position.

Figure 2:
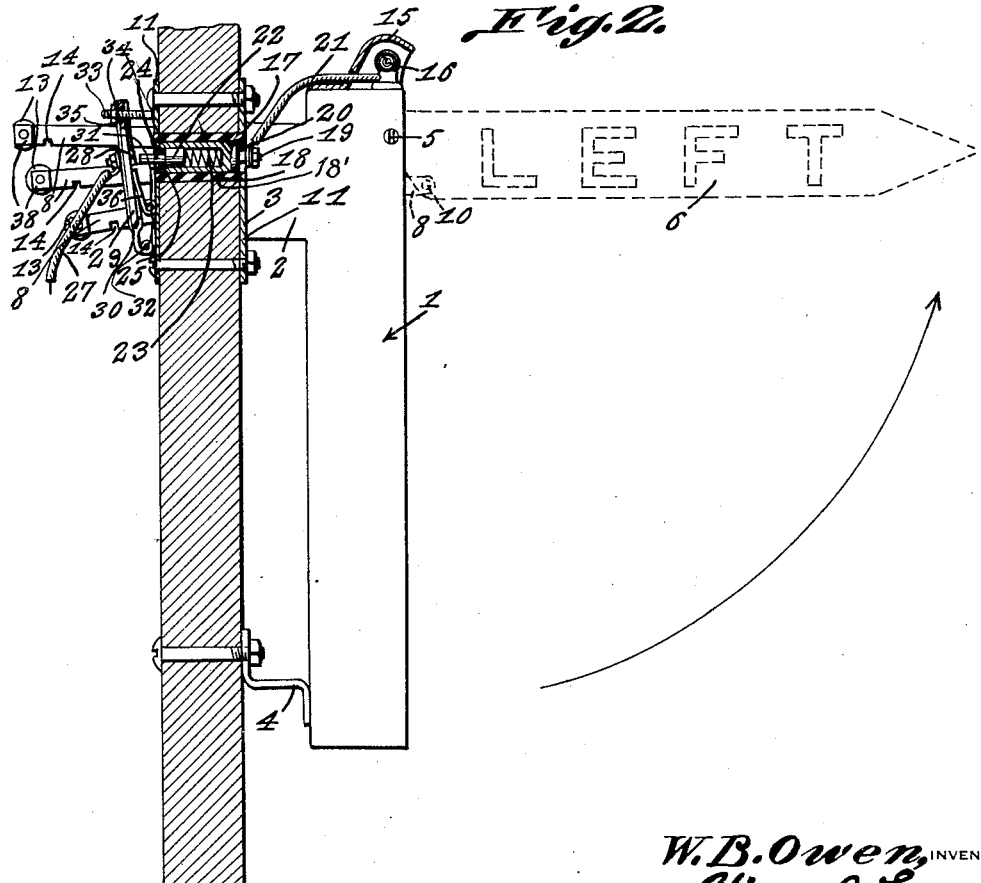
Figure 2 is a view partly in elevation and partly in section illustrating the device.

When moved to this position, the signal arm will remain therein until an upward thrust is exerted upon the finger knob of the said arm 8 so as to elevate the arms and permit the same to slide through the slot in which it is mounted and at this time the spring 23 will shift the plunger 22 to the position shown in Figure 2 and the spring 36 will swing the swinging contact member to position, likewise shown in Figure 6, in which position the contact element 28 will be out of engagement with the stem 24 of the plunger 22 thus breaking the circuit through the light bulb.

What I claim is:—

A signal comprising an elongated housing open at one side and provide at its opposite side and in the vicinity of one end with a lateral extension, a series of signal arms pivoted in the housing at a point opposite the end of said extension, a lamp mounted upon the housing above the signal arms, a resilient contact member attached to the extension electrically connected with the lamp, a resilient strip mounted for pivoted movement having a contact mounted thereon and adapted to engaged said contact on the contact member, a conductor connected with said strip, a series of bars slidable in the extension and pivotally connected with the respective arms, said bars being mounted one above the other in the same vertical plane, on one side of the strip, each bar having a projection for engaging the pivoted strip when the bar is moved to operative position and means for holding the bars in operative position.

In testimony whereof I affix my signature.

WILLIAM B. OWEN.